United States Patent
Yamamura et al.

(10) Patent No.: US 6,432,245 B1
(45) Date of Patent: Aug. 13, 2002

(54) METHOD FOR MANUFACTURING A THIN METAL FILM WITH EMBOSSED PATTERN

(75) Inventors: Yoshihiro Yamamura, Nagoya; Nobuhiro Ito, Nishikamo-gun, both of (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 09/619,155

(22) Filed: Apr. 7, 1999

(30) Foreign Application Priority Data

Apr. 22, 1998 (JP) .......................................... 10-112107

(51) Int. Cl.[7] .............................................. B29D 11/00
(52) U.S. Cl. ...................... 156/209; 156/231; 156/232; 156/235; 156/247; 156/307.1; 156/307.7; 264/3
(58) Field of Search ................................ 156/231, 232, 156/209, 219, 289, 307.1, 307.7, 308.2, 309.6, 235, 247; 264/1.34, 1.6, 1.7, 284, 293, 1.9; 427/162

(56) References Cited

U.S. PATENT DOCUMENTS

| | | | |
|---|---|---|---|
| 2,839,378 A | | 6/1958 | McAdow |
| 3,689,346 A | * | 9/1972 | Rowland ...................... 156/245 |
| 3,765,940 A | | 10/1973 | Hentzschel |
| 3,811,983 A | * | 5/1974 | Rowland ...................... 156/245 |
| 4,154,901 A | | 5/1979 | Sigsbee |
| 4,321,087 A | | 3/1982 | Levine et al. |
| 4,414,316 A | * | 11/1983 | Conley ........................ 428/162 |
| 4,420,502 A | * | 12/1983 | Conley ........................ 156/245 |
| 4,420,527 A | * | 12/1983 | Conley ........................ 427/162 |
| 4,601,861 A | * | 7/1986 | Pricone et al. ............... 264/1.6 |
| 4,754,012 A | | 6/1988 | Yoldas et al. |
| 4,758,003 A | | 7/1988 | Goldstein et al. |
| 4,906,315 A | * | 3/1990 | McGrew ..................... 156/231 |

(List continued on next page.)

FOREIGN PATENT DOCUMENTS

| | | |
|---|---|---|
| JP | A-55-160060 | 12/1980 |
| JP | A-6-24199 | 2/1994 |
| JP | A-6-51682 | 2/1994 |
| JP | A-8-502301 | 3/1996 |
| WO | WO 89/01016 | 2/1989 |

OTHER PUBLICATIONS

Kirk Othmer Encyclopedia of Chemical Technology, 1997, John Wiley and Sons, 4th Ed., vol. 24, p. 980.*

Primary Examiner—Michael W. Ball
Assistant Examiner—Barbara J. Musser
(74) Attorney, Agent, or Firm—Oliff & Berridge, PLC

(57) ABSTRACT

A method for manufacturing a thin metal film with an embossed pattern, which enables the precise transfer of the embossed pattern and generates a strong interference color is provided. An embossing belt 10 having an embossed pattern formed on one surface thereof is coated with a thermosetting transparent resin 12. The transparent resin 12 is dried and cured and is coated with PVA which is sintered to form a PVA layer 20, whereby the transfer of the embossed pattern is completed. After that, the transparent resin 12 with the PVA layer 20 bonded to the surface opposite to the embossed pattern is peeled from the embossing belt 10 and reeled in, and an aluminum layer 24 is deposited on the surface of the belt 10 on which the embossed pattern is formed. The aluminum layer 24 is coated with another transparent resin and the PVA layer 20 is removed through a dissolving step. Resulting resin layers are pulverized to create a hologram pigment.

8 Claims, 3 Drawing Sheets

U.S. PATENT DOCUMENTS

| | | |
|---|---|---|
| 4,971,841 A | 11/1990 | Panush et al. |
| 5,116,703 A | 5/1992 | Badesha et al. |
| 5,325,580 A | 7/1994 | Gruber et al. |
| 5,335,526 A | 8/1994 | Garrison et al. |
| 5,480,231 A | 1/1996 | Sasaki et al. |
| 5,500,311 A | 3/1996 | King et al. |
| 5,554,432 A * | 9/1996 | Sandor et al. .............. 428/162 |
| 5,624,076 A | 4/1997 | Miekka et al. |
| 5,629,068 A | 5/1997 | Miekka et al. |
| 5,650,248 A | 7/1997 | Miekka et al. |
| 5,672,097 A * | 9/1997 | Hoopman .................... 51/293 |
| 5,672,410 A | 9/1997 | Miekka et al. |
| 5,831,766 A * | 11/1998 | Martin et al. ............... 359/529 |
| 5,849,369 A | 12/1998 | Ogawa |
| 5,851,602 A | 12/1998 | Law et al. |
| 5,980,992 A | 11/1999 | Kistner et al. |
| 6,068,691 A | 5/2000 | Mickka et al. |
| 6,112,388 A | 9/2000 | Kimoto et al. |

* cited by examiner

METHOD FOR MANUFACTURING A THIN METAL FILM WITH EMBOSSED PATTERN

BACKGROUND OF THE INVENTION

1. Field of the Invention

The present invention relates to a method of manufacturing a thin metal film with an embossed pattern formed thereon to be used as a pigment material for holograms.

2. Description of the Related Art

Thin metal films having embossed pattern has conventionally been known as a pigment material for hologram. Such a thin metal film has an embossed surface which forms a pattern thereon, as shown in FIG. 4, to produce a superior iridescent effect through diffraction and interference of incoming light. Hologram pigments using such a thin metal film show stronger interference colors than conventional pigments made of, for example, mica, as shown in FIG. 5.

A typical method for manufacturing such a thin metal film with embossed pattern is disclosed in Japanese Patent Laid-Open Publication No. Hei 6-24199, in which the embossed pattern is first transferred to a thermoplastic resin and a thin metal film is deposited on the surface where the embossed pattern is transferred.

Thermoplastic resin is therefore required in such conventional methods. Because of this, it is difficult to precisely transfer the embossed pattern by pressing the embossed pattern formed on a die against the thermoplastic resin, because the resin is usually a relatively soft material. Also, because of the high temperature of the thermoplastic resin heated while manufacturing the thin metal film with embossed pattern, deformation or lose of the embossed pattern that has been transferred to the thermoplastic resin is not uncommon.

For these reasons, superior interference colors cannot be obtained by the thin metal film with embossed pattern which is fabricated using thermoplastic resin.

SUMMARY OF THE INVENTION

The present invention is made to solve the above-described problems and provides a method for manufacturing a thin metal film with embossed pattern which is capable of precisely receiving the embossed pattern and delivers a strong interference color.

The above object is achieved by a method for manufacturing a thin metal film with embossed pattern according to the present invention which includes steps of pressing an embossed original plate against a thermosetting resin, heat curing the thermosetting resin, peeling off the embossed original plate from the thermosetting resin, and forming a thin metal film on the embossed surface of the thermosetting resin.

Alternatively, the present invention provides a method for manufacturing a thin metal film with an embossed pattern including steps of applying a thermosetting resin to an embossed original plate, heat curing the thermosetting resin, applying to the thermosetting resin a second resin having high affinity with the thermosetting resin, binding the resins together, peeling off the embossed original plate from the thermosetting resin bonded to the high affinity resin, and forming a thin metal film on the embossed surface of the thermosetting resin.

It is a feature of the present invention that a coating containing a hydrocarbon group is applied to the surface of the embossed original plate prior to applying the thermosetting resin.

The hydrocarbon group is methyl, phenyl, hexyl, or decyl; the resin having high affinity with the thermosetting resin is polyvinylalcohol; and the thermosetting resin is a silicon or acrylic crosslinking resin.

It is another feature of the present invention that the step of heating and curing the thermosetting resin is carried out by heating the thermosetting resin until it is half-cured.

Alternatively, the present invention provides a method for manufacturing a thin metal film with an embossed pattern including steps of pressing an embossed surface of a heated die against a thermosetting resin while it is being cured, removing the die from the thermosetting resin, and forming a thin metal film on the embossed surface of the thermosetting resin.

It is a feature of the present invention that the die is a transfer roller having an embossed pattern formed on its surface.

Therefore, the present invention can ensure that the embossed pattern is precisely transferred by drying and curing the thermosetting resin on the embossed original plate before peeling off the resin from the original plate.

In addition, it is possible to peel off the thermosetting resin easily from the embossing belt, because the thermosetting resin is adhered to a resin having high affinity with the thermosetting resin.

It is also possible to further ensure the precise transfer of the embossed pattern, because the thermosetting resin is hardened while the embossed original plate is pressed against the resin.

DESCRIPTION OF THE PREFERRED EMBODIMENTS

Preferred embodiments of the present invention will be described below with reference to the attached drawings.

Embodiment 1

Figure 1:
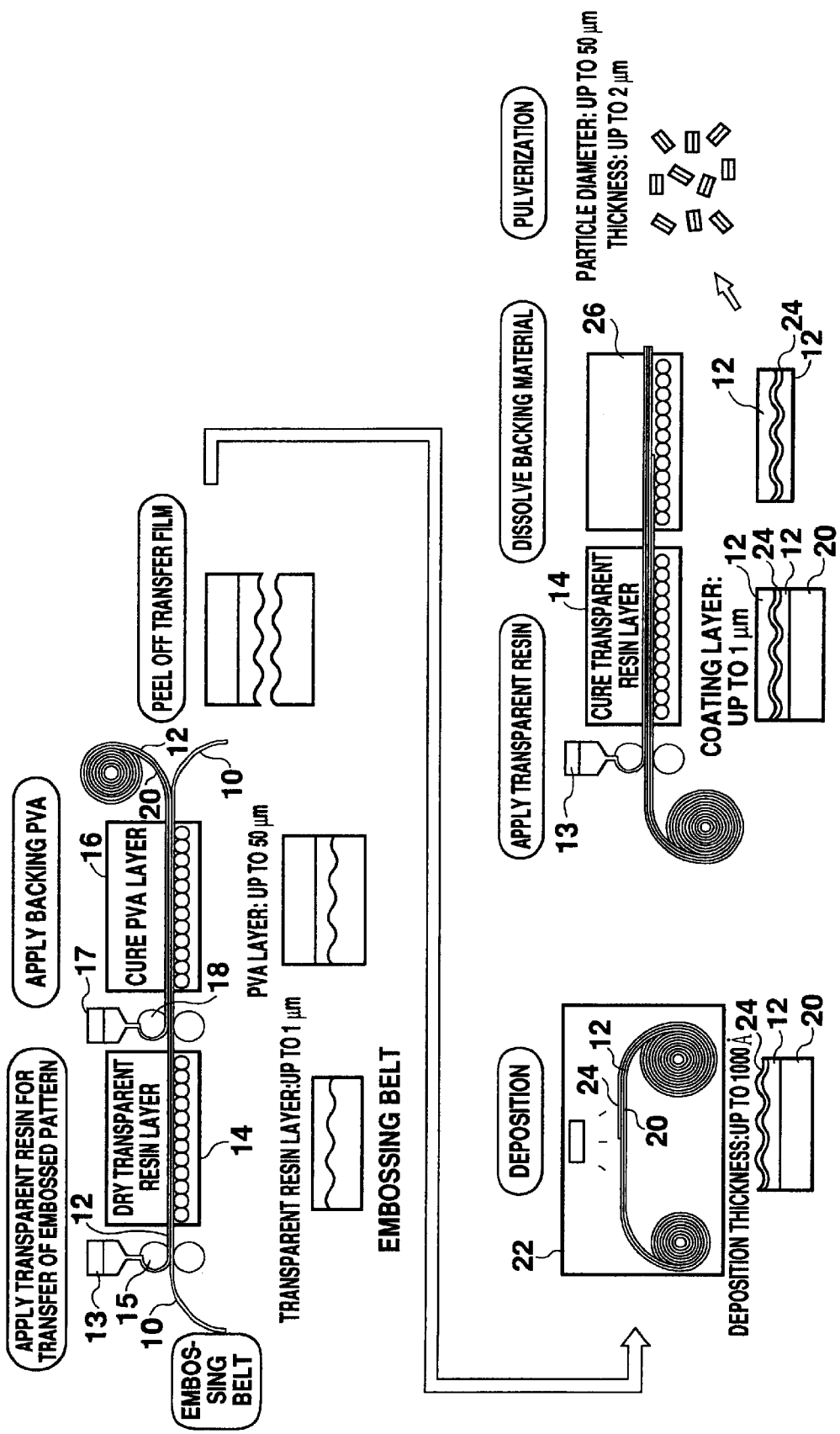
FIG. 1 outlines a manufacturing method of a thin metal film with embossed pattern according to a first embodiment of the present invention.

FIG. 1 illustrates a process of manufacturing a thin metal film according to a first embodiment of the present invention. In FIG. 1, an embossed surface of an embossing belt 10 is first coated with a transparent resin 12 which is fed from a transparent resin tank 13 and is applied to the embossing belt 10 using rollers 15. The transparent resin 12 used is a thermosetting resin. The applied transparent resin 12 is adjusted to have a thickness of 0.1–5 $\mu$m, and preferably 0.2–0.6 $\mu$m.

The transparent resin 12 coated on the embossing belt 10 is passed through a dryer 14 so as to evaporate a solvent and is heated and sintered at 40–100° C. for about 10 seconds to 30 minutes until it is half- or fully-cured. Thus, the embossed pattern formed on the surface of the embossing belt 10 is transferred to the transparent resin 12.

The embossing belt 10 used herein may be fabricated, for example, by attaching embossed nickel original plates to a flat and smooth surface of a continuous steel belt. In addition, it is preferrable to cover the embossed original plates with a coating containing a hydrocarbon group so as to facilitate the subsequent step of peeling off the embossing belt 10 from the transparent resin 12. Such a coating can be prepared the hydrolysis and condensation reactions of a material selected from the group consisting of dimethyldimethoxysilane, methyltrimethoxysilane, phenyltrimethoxysilane, diphenyldimethoxysilane, hexyltrimethoxysilane, decyltrimethoxysilane, and the like, with the resulting solution being coated on the surface of the nickel original plates and sintered. Thus, the surface of the nickel original plates on the embossing belt 10 is coated with the hydrocarbon group, such as methyl, phenyl, hexyl, decyl, or the like.

After that, a PVA layer 20 is formed on the surface of the transparent resin 12, which is heated and cured on the embossing belt 10 by applying a solution of polyvinylalcohol (PVA) (PVA concentration of 5–20%) and sintering and drying it in a sintering device 16. PVA is fed from a PVA tank 17 to rollers 18 and is applied to the surface of the transparent resin 12 with the rollers 18. The thickness of the PVA layer 20 should be between 10–50 $\mu$m, and preferably 20–30 $\mu$m, after it is dried at 100–160° C. for about 5–30 minutes. It is noted that the PVA layer 20 is a resin having high affinity with the thermosetting resin according to the present invention.

The transparent resin 12 with the PVA layer 20 adhered thereto is then peeled from the embossing belt 10 and temporarily reeled in.

The wound transparent resin 12 having the embossed pattern transferred to one surface and the PVA layer 20 adhered to the other surface thereof is put in a deposition apparatus 22, where an aluminum layer 24 is deposited on the embossed surface of the transparent resin 12. The deposited aluminum layer 24 has a thickness of 200–1,500 Å, and preferably 300–1,000 Å.

After that, the second transparent resin 12 is applied to the surface of the deposited aluminum layer 24 by coating the surface with the transparent resin 12 fed from the transparent resin tank 13 using the rollers 15, as described above. The coating of the transparent resin is dried and cured using dryer 14, and the resulting film having a four-layer structure is then immersed in a large amount of water in a dissolving apparatus 26, so as to dissolve the PVA layer 20 to obtain a film in which the transparent resin 12 covers both sides of the aluminum layer 24. The dissolving step of the PVA layer 20 can be completed in 30 seconds to several minutes. The resulting film having a three-layer structure is very thin and very fragile. Therefore, as the PVA layer 20 is dissolved in water and removed, the film loses its reinforcement material and is spontaneously roughly pulverized. After drying the roughly pulverized flakes, they are again crushed in order to achieve an appropriate size for paint pigment, thereby obtaining a thin metal film (or hologram pigment) with an embossed pattern according to the present invention. Pulverized flakes have a particle size of 5–50 $\mu$m, preferably 10–30 $\mu$m, and a thickness of 0.3–5 $\mu$m, preferably 0.5–1.5 $\mu$m. Pulverization can be carried out with commonly used means, such as a ball mill, rotor speed mill, homogenizer, or the like.

It is preferable for the transparent resin 12 having the thermosetting nature to have a hardness exceeding the pencil lend hardness H after it is cured. If the resin is softer, it cannot be pulverized into particles having a diameter of less than 50 $\mu$m which are preferrable for hologram pigment. If such a softer resin is forcibly pulverized, undesired scratches will be formed on the transparent resin 12 coated with the aluminum layer 24 and, eventually, the transparent resin 12 will be detached from the aluminum layer 24.

The transparent resin 12 made of thermosetting resin has a characteristic that it does not significantly swell when mixed with the solvent or the like to form paint. Also, the thus obtained hologram pigment is not softened in the paint during, for example, the drying and sintering step. This helps prevent deformation of the embossed pattern and reduction of strength of the interference color.

Examples of such a thermosetting resin are silicon based resins and acrylic crosslinking resins. In particular, a silicon based resin, such as methyltrimethoxysilane, is preferred in respect of transparency, pulverization ability, and durability. An epoxy based silicon resin, such as $\gamma$-glycide xypropyltrimethoxysilane, has an excellent ability of being attached to aluminum. It is preferable to use hydrocarbons, such as hexane or heptane, as a solvent for such thermosetting resins in that they can stick well to the surface of the nickel original plate with embossed pattern, are not repelled when applied to the original plate, and can easily be peeled off when dried.

Embodiment 2

Figure 2:
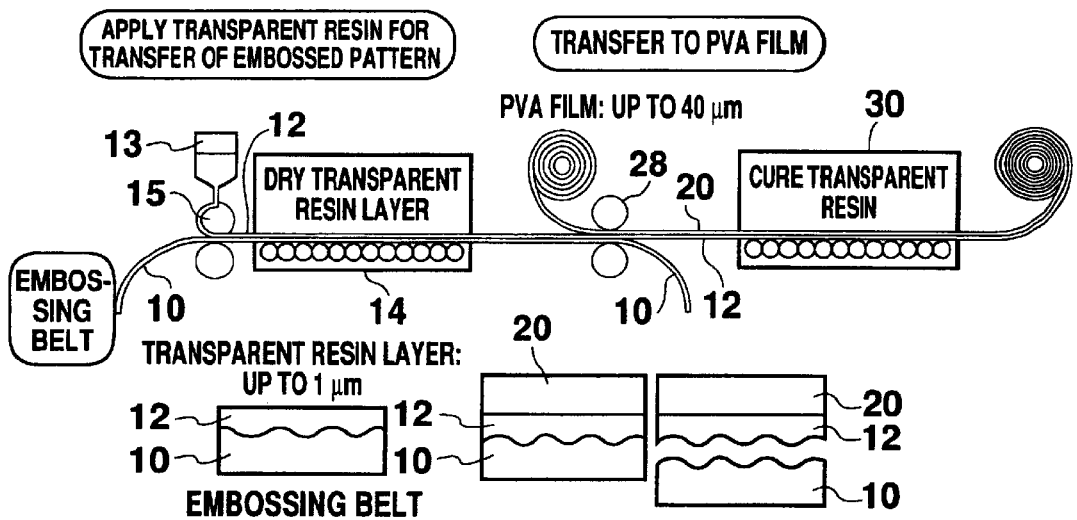
FIG. 2 outlines a manufacturing method of a thin metal film with embossed pattern according to a second embodiment of the present invention.

FIG. 2 shows a method of manufacturing a thin metal film with embossed pattern according to a second embodiment of the present invention. Similar to the process shown in FIG. 1, the embossing belt 10 of FIG. 2 is coated with the transparent resin 12 from the transparent resin tank 13 by the rollers 15 and is dried so as to transfer the embossed pattern formed on the embossing belt 10 to the transparent resin 12. At this point, the transparent resin 12 is heated and sintered to the half-cured state at 40–100° C. for 10 seconds–20 minutes, rather than being cured completely.

A feature of this embodiment is that a PVA layer 20 is formed by contact bonding of a PVA film on the surface opposite to the surface facing the embossing belt 10 of the transparent resin 12. The PVA film is bonded to the transparent resin 12 through contact bonding rollers 28. The contact bonding rollers 28 is heated to 100–250° C., and preferably 150–200° C., so that the PVA film is heat bonded to the transparent resin 12, which further ensures the contact bonding of the PVA film to the transparent resin 12. It is preferable to raise the temperature of the embossing belt 10 as high as possible to promote the bonding between the transparent resin 12 and the PVA film.

The transparent resin 12 with the PVA layer 20 formed thereon using the PVA film will spontaneously detach from the embossing belt 10. To avoid this, the transparent resin 12 with the PVA layer 20 bonded thereto is made to pass through a dryer 30 so as to further harden the transparent resin 12 at 100–160° C. for 1–20 minutes. When dried, the transparent resin 12 is reeled in temporarily.

Subsequent to the winding, similar steps as those shown in FIG. 1 will be repeated. Namely, after the aluminum layer 24 is deposited on the transparent resin 12, another transparent resin 12 is applied to the aluminum layer 24, the PVA layer 20 is dissolved and removed, and the belt is pulverized to provide hologram pigment.

In this embodiment, the film strength of the PVA layer 20 can be improved and the inconvenient deformation of the thin metal film with embossed pattern during the processing can be prevented, because the PVA layer 20 is formed by the PVA film. And drying time can be reduced because a PVA solution is not used.

Embodiment 3

Figure 3:
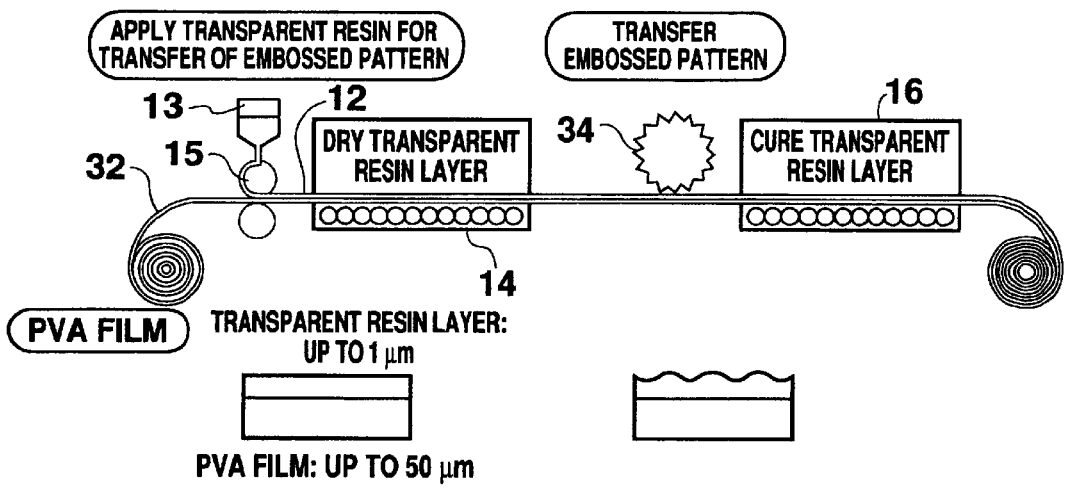
FIG. 3 outlines a manufacturing method of a thin metal film with embossed pattern according to a third embodiment of the present invention.
Figure 4:
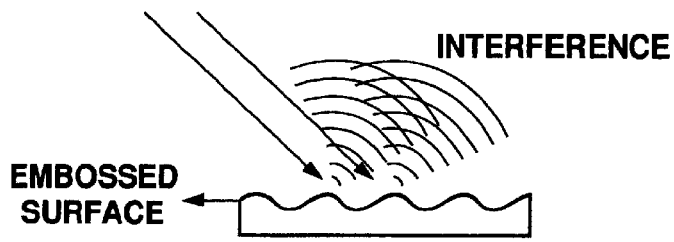
FIG. 4 shows the interference of a hologram pigment having an embossed pattern formed on its surface.
Figure 5:
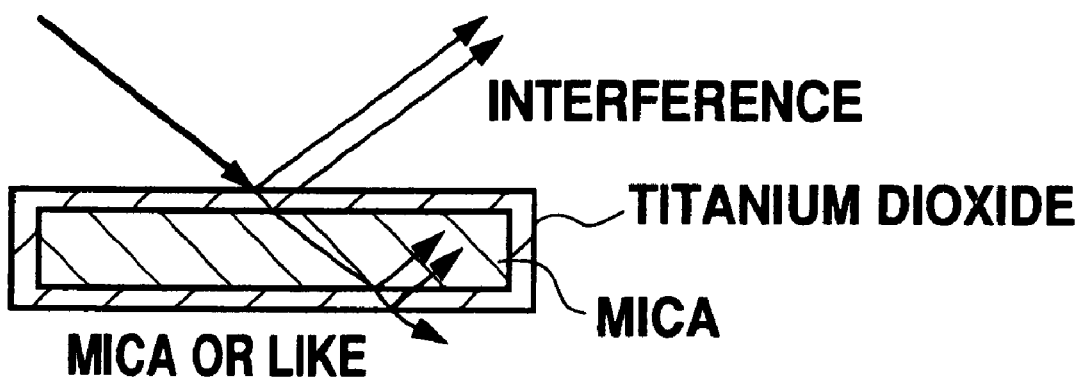
FIG. 5 shows the interference of mica in a conventional method.

FIG. 3 shows a method of manufacturing a thin metal film with embossed pattern according to a third embodiment of the present invention. Unlike the process shown in FIGS. 1 and 2, the embossing belt 10 is not used in FIG. 3. Instead, the transparent resin 12 is fed from the transparent resin tank 13 through the rollers 15 and is applied to a PVA film 32. The PVA film 32 has a thickness of 10–50 μm, and preferably 20–30 μm. A thickness of the transparent resin 12 coated on the PVA film 32 is 0.1–5 μm, and preferably 0.2–0.6 μm after it is dried and cured. The PVA film 32 coated with the transparent resin 12 is then made to pass through the dryer 14 and heated to the half-cured state at 40–120° C. for 10 seconds–10 minutes.

Next, a die having embossed pattern formed on its surface is pressed against the half-cured transparent resin 12 so as to transfer the embossed pattern to the transparent resin 12. The die is heated to 100–250° C., and preferably 150–230° C., to allow the transfer of the embossed pattern to the surface of the transparent resin 12 and the hardening of the transparent resin 12 having the thermosetting nature to be carried out simultaneously. In this method, the embossed pattern can be transferred in a more precise manner because the surface of the transparent resin 12 is cured while the die is still in contact with the resin 12. Also, it is possible to prevent the deformation of the pattern due to shrinkage of the resin which is likely to occur after the die is taken away from the transparent resin.

Such a die may be formed by a commonly used plate-shaped nickel original plate. Alternatively, it may be preferable to use a transfer roller 34 having an embossed pattern formed on its surface, as shown in FIG. 3. The surface of the nickel original plate or the transfer roller 34 is coated with a hydrocarbon or the like to completely prevent the attachment of the transparent resin 12. Such a hydrocarbon may be replaced by a fluororesin, preferably fluoroalkylsilane.

It is noted that the drying step by the dryer 14, as mentioned above, may not be necessary depending on the heating condition used while transferring the embossed pattern to the transparent resin 12 by the nickel original plate or the transfer roller 34.

After the embossed pattern is transferred to the transparent resin 12 using the above-mentioned die, the transparent resin 12 is peeled from the die and is sintered and hardened, as desired, by the sintering apparatus 16 at 100–160° C. for 1–20 minutes. This sintering step can be eliminated when the transparent resin 12 is sufficiently hardened during the transfer of the embossed pattern. Then, the transparent resin 12 with the transferred embossed pattern is reeled in and, after that, similar steps as shown in FIG. 1 are repeated.

While there have been described what are at present considered to be preferred embodiments of the present invention, it will be understood that various modifications may be made thereto, and it is intended that the appended claims cover all such modifications as fall within the true spirit and scope of the invention.

What is claimed is:

1. A method of manufacturing a thin metal film with an embossed pattern, comprising:

applying a thermosetting resin on an embossed original plate, heat curing said thermosetting resin to a half-cured state, applying a polyvinyl alcohol (PVA) resin to said thermosetting resin, bonding these resins together, followed by sintering said half-cured thermosetting resin peeling said embossed original plate from the thermosetting resin adhered to the PVA resin, forming a thin metal film on the embossed surface of said thermosetting resin, and removing the PVA resin from the thermosetting resin adhered to said thin metal film.

2. A method of manufacturing a thin metal film with an embossed pattern according to claim 1, further comprising applying a coating of a compound containing a hydrocarbon group to the surface of said embossed original plate before applying said thermosetting resin to said embossed original plate.

3. A method of manufacturing a thin metal film with an embossed pattern according to claim 2, wherein said hydrocarbon group is methyl, phenyl, hexyl, or decyl.

4. A method of manufacturing a thin metal film with an embossed pattern according to claim 1, wherein said thermosetting resin is a silicon resin or an acrylic crosslinking resin.

5. A method of manufacturing a thin metal film with an embossed pattern, comprising:

pressing a heated die having an embossed pattern formed on its surface against a half-cured thermosetting resin, applying to said half-cured thermosetting resin a polyvinyl alcohol (PVA) resin, bonding these resins together, removing said die from said thermosetting resin, followed by sintering said half-cured thermosetting resin forming a thin metal film on the embossed surface of said thermosetting resin, and removing the PVA resin from the thermosetting resin adhered to said thin metal film.

6. A method of manufacturing a thin metal film with an embossed pattern according to claim 5, wherein said die is a transfer roller having and embossed pattern formed on its surface.

7. The method of claim 1, wherein said thin metal film is formed with said embossed pattern.

8. The method of claim 1, further comprising depositing a second layer on said thin metal film, which is deposited on said thermosetting resin wherein a multi-layer resin film is formed and pulverizing said multi-layer resin film.

* * * * *